United States Patent
Peer et al.

(10) Patent No.: US 8,621,586 B1
(45) Date of Patent: Dec. 31, 2013

(54) USING BASELINE PROFILES IN ADAPTIVE AUTHENTICATION

(75) Inventors: Oded Peer, Raanana (IL); Yedidya Dotan, Tel Aviv (IL); Yael Villa, Tel Aviv (IL); Marcelo Blatt, Modiin (IL)

(73) Assignee: EMC Corporation, Hopkinton, MA (US)

( * ) Notice: Subject to any disclaimer, the term of this patent is extended or adjusted under 35 U.S.C. 154(b) by 126 days.

(21) Appl. No.: 13/246,937

(22) Filed: Sep. 28, 2011

(51) Int. Cl.
    *G06F 21/20* (2006.01)
(52) U.S. Cl.
    USPC .................................. 726/7; 726/2
(58) Field of Classification Search
    USPC ........................................ 726/2, 6
    See application file for complete search history.

(56) References Cited

U.S. PATENT DOCUMENTS 7,908,644 B2 * 3/2011 Roskind et al. ............... 726/3

OTHER PUBLICATIONS

Misra et al., "Finding Repeated Elements," Sci. Comp. Prog. 2, 143-152 (1982).
"Heavy Hitters," Pioty Indyk, MIT, retrieved from http://people.csail.mit.edu/indyk/Rice/Iec4.pdf, 18 pages.

* cited by examiner

*Primary Examiner* — Jung Kim
*Assistant Examiner* — Janusz Kusyk
(74) *Attorney, Agent, or Firm* — BainwoodHuang (57) ABSTRACT

An improved technique of processing an authentication request from an authentication requestor involves an adaptive authentication device comparing a behavioral history of fact values associated with a user over a current time window with a user's baseline profile that includes a behavioral history of the fact values. The adaptive authentication device accesses such a behavioral history over several previous time windows from a database whose entries include a user identifier, a time interval and user data which represents fact value behavioral history over the time interval. When the device receives an authentication request from an authentication requestor, the adaptive authentication device matches a username of the request with a user identifier of an entry of the database whose time period is the current time period. The adaptive authentication device then updates fact values representing the user's current behavioral history and compares the current behavioral history to the user's baseline profile.

17 Claims, 8 Drawing Sheets

---

Receiving the authentication request at an adaptive authentication system which includes a database having a set of entries, each entry of the set of entries including an identifier and previous user data, the adaptive authentication system being constructed and arranged to perform an adaptive authentication operation on the authentication request, the adaptive authentication operation being constructed and arranged to generate an adaptive authentication result which indicates a likelihood of the current user data being associated with a fraudulent user — 62

Performing the adaptive authentication operation on the authentication request, including:
• Matching the user identifier of the authentication request with an identifier of a particular entry of the database
• Performing a comparison of the current user data of the request with the previous user data of the particular entry, the comparison producing a comparison result
• Generating an adaptive authentication result based on the comparison result — 64

Sending the adaptive authentication result to the authentication requestor — 66

| 40 | EMEA | | N America | | S Asia |
|---|---|---|---|---|---|
| | TLV | HZ | NY | Boston | Bangalore |
| Current | 5 | 1 | 11 | 2 | 4 |
| Period 0 | 13 | 6 | 4 | 1 | 0 |
| Period 1 | 4 | 0 | 18 | 4 | 0 |
| Period 2 | 0 | 4 | 6 | 2 | 0 |
| Period 3 | 5 | 11 | 23 | 3 | 0 |

16

| Aggregation Function | Aggregated Value |
|---|---|
| Count(N America, Period 0, Period 3) | 61 |
| Proportion(N America,Period 1, Period 3) | 0.7 |
| AverageFreq(N America, Period 0, Period 2) | 11.7 |
| StdDev(N America, Period 0, Period 2) | 9.07 |

| 44 | Min | Max | Sum | Count |
|---|---|---|---|---|
| Current | 5 | 5 | 10 | 2 |
| Period 0 | 4 | 4 | 4 | 1 |
| Period 1 | 11 | 20 | 71 | 4 |
| Period 2 | 2 | 4 | 6 | 2 |
| Period 3 | 5 | 13 | 23 | 3 |

| Aggregation Function | Aggregated Value |
|---|---|
| Max(Period 0, Period 3) | 20 |
| Min(Period 1, Period 3) | 2 |
| Sum(Period 0, Period 3) | 104 |
| Average(Period 0, Period 3) | 10.4 |

Figure 4(b)

| 48 | 2 | 3 | 4 | 5 |
|---|---|---|---|---|
| Current | 5 | 1 | 11 | 2 |
| Period 0 | 13 | 6 | 4 | 1 |
| Period 1 | 4 | 0 | 18 | 4 |
| Period 2 | 0 | 4 | 6 | 2 |
| Period 3 | 5 | 11 | 23 | 3 |

16 ↗

| Aggregation Function | Aggregated Value |
|---|---|
| Median(Period 1, Period 3) | 4 |
| InterquartileRange(Period 0, Period 2) | 1 |
| Average(Period 0, Period 2) | 3.40 |
| StdDev(Period 0, Period 2) | 1.02 |

USING BASELINE PROFILES IN ADAPTIVE AUTHENTICATION

BACKGROUND

Service providers receive login attempts from users wishing to gain access to sensitive information such as bank accounts. Some users attempt to gain access to such information with credentials obtained fraudulently from a legitimate account holder.

Conventional adaptive authentication identifies fraudulent users even though such users possess credentials to gain access to a legitimate user's account information. For example, each login attempt is received at the service provider at a particular time and in many cases, a fraudulent user will send login attempts at times outside of those expected by a service provider. Specifically, conventional adaptive authentication identifies a user with the same credentials who logs into the account between 2 AM and 4 AM as a high risk of being a fraudulent user.

Conventional adaptive authentication compares information associated with a login attempt received by the service provider, such as the time of the login and a location from where the login originated, with a historical record of a typical user who exhibits some expected login behavior. As an illustration, the typical user's historical record indicates that 99.5% of login attempts received by the service provider occur between the hours of 6 AM and 11 PM daily and from locations within the continental United States. For a user sending login attempts between 2 AM and 4 AM from locations across Eastern Europe, conventional adaptive authentication methods indicate to the service provider that the user is a high risk of being a fraudulent user.

SUMMARY

Unfortunately, there are deficiencies with the above-described conventional adaptive authentication methods. For example, there are situations in which a legitimate user exhibits login behavior that is significantly different from the login behavior exhibited by the typical user. Suppose that the typical user sends login attempts to the service provider between the hours of 6 AM and 11 PM daily and from locations within the continental United States; the legitimate user, on the other hand, has consistently sent login attempts to the service provider between 2 AM and 4 AM daily from locations across Eastern Europe over the past several months. The conventional adaptive authentication would then penalize the legitimate user in terms of consideration as a high risk of being a fraudulent user, even though the legitimate user merely has habits which differ from those expected by conventional adaptive authentication.

In contrast to the conventional adaptive authentication methods which compare login behaviors of users to those of a typical user, an improved technique of processing an authentication request from an authentication requestor involves an adaptive authentication device comparing a login behavior associated with a username to the user's baseline profile, which includes previous login behavior associated with the username. The adaptive authentication device accesses such a previous login behavior from a database whose entries include a user identifier, a time interval and user data which represents login behavior over the time interval. When the adaptive authentication device receives a login request from an authentication requestor, the adaptive authentication device matches a username of the request with a user identifier of an entry of the database whose time period is the current time period. The adaptive authentication device then updates the user data and compares the resulting current login behavior to the user's baseline profile.

It should be understood that a user identifier can be any entity participating in the event such as a user or an IP; such an entity contains, for example, sub entities with which the entity interacts (e.g., payees, devices, IP addresses, etc.).

Advantageously, the improved technique allows for an authentication requestor to receive more accurate information concerning a risk of fraudulence associated with a particular user. Taking the example of the legitimate user above, the improved technique compares the legitimate user's current login behavior with the legitimate user's baseline profile. Because the legitimate user's current login behavior is consistent with the legitimate user's baseline profile within certain statistical metrics, the legitimate user's login requests are not mistaken as a high risk of being associated with fraudulent activity.

It should be understood that memory requirements for storing individual baseline profiles are severe and, in many cases, unrealistic. The improved techniques address this storage problem by dynamically selecting only the most significant facts from the login request to store within a database entry. Specifically, a new fact is only stored when the adaptive authentication device has received the new fact repeatedly since the adaptive authentication device last updated an existing fact. By limiting the range of facts in this way, the adaptive authentication device limits the amount of memory used to implement the improved technique.

One embodiment of the improved technique is directed to a method of processing an authentication request from an authentication requestor. The method includes receiving the authentication request at an adaptive authentication system which includes a database having a set of entries, each entry of the set of entries including an identifier and previous user data, the adaptive authentication system being constructed and arranged to perform an adaptive authentication operation on the authentication request, the adaptive authentication operation being constructed and arranged to generate an adaptive authentication result which indicates a likelihood of the current user data being associated with a fraudulent user. The method also includes performing the adaptive authentication operation on the authentication request. The method further includes sending an adaptive authentication result to the authentication requestor.

Performing the adaptive authentication operation on the authentication request includes matching the user identifier of the authentication request with an identifier of a particular entry of the database. Performing the adaptive authentication operation on the authentication request also includes performing a comparison of the current user data of the request with the previous user data of the particular entry, the comparison producing a comparison result. Performing the adaptive authentication operation on the authentication request further includes generating an adaptive authentication result based on the comparison result.

Additionally, some embodiments of the improved technique are directed to a system for processing an authentication request from an authentication requestor. The system includes a network interface coupled to a network, a memory and a processor coupled to the memory, the processor configured to carry the method of processing an authentication request from an authentication requestor.

Furthermore, some embodiments of the improved technique are directed to a computer program product having a non-transitory computer readable storage medium which stores code including a set of server instructions to carry the method of processing an authentication request from an authentication requestor.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved technique of processing an authentication request from an authentication requestor involves an adaptive authentication device comparing a behavioral history of fact values associated with a user over a current time window with a user's baseline profile that includes a behavioral history of the fact values over several previous time windows. The adaptive authentication device accesses such a behavioral history over several previous time windows from a database whose entries include a user identifier, a time interval and user data which represents fact value behavioral history over the time interval. When the adaptive authentication device receives an authentication request from an authentication requestor, the adaptive authentication device matches a username of the request with a user identifier of an entry of the database whose time period is the current time period. The adaptive authentication device then updates fact values representing the user's current behavioral history and compares the current behavioral history to the user's baseline profile.

Figure 1:
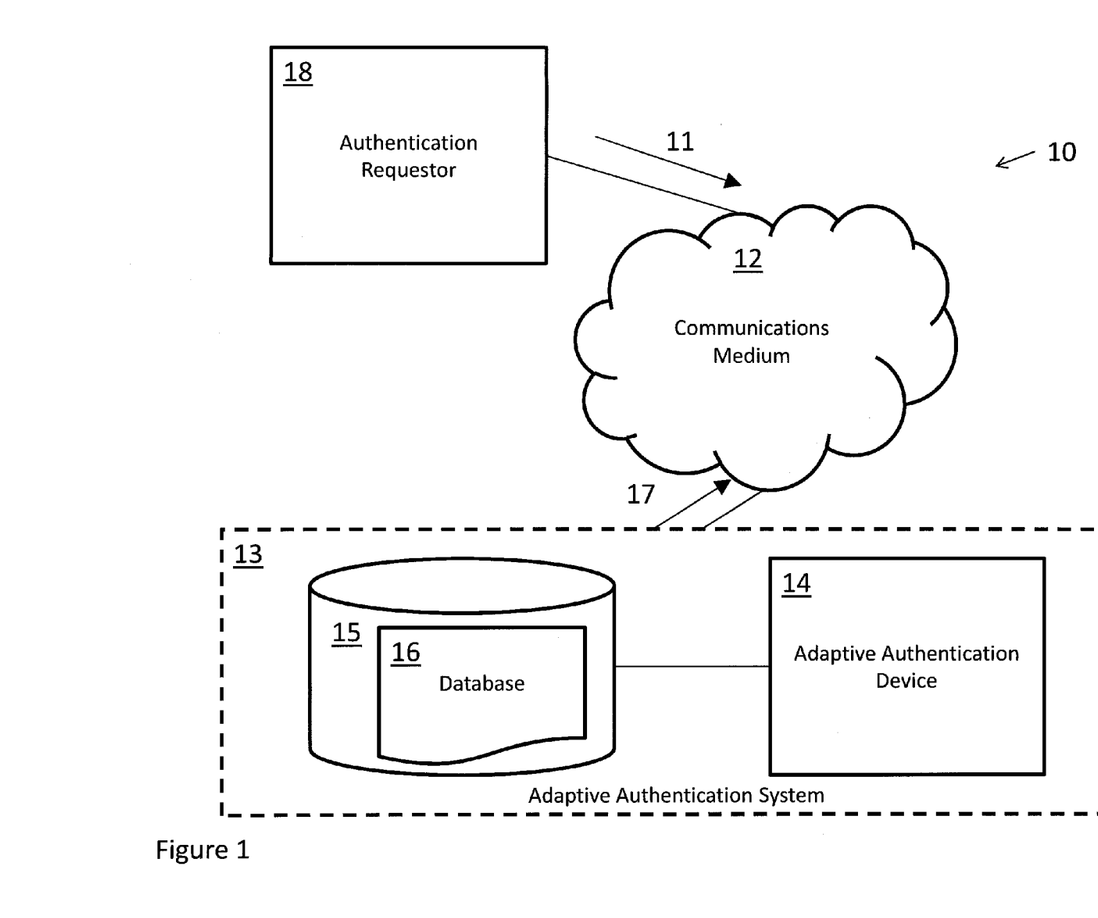
FIG. 1 is a schematic diagram illustrating an electronic environment for carrying out the improved technique.

FIG. 1 illustrates an electronic environment 10 for carrying out the improved technique. Electronic environment 10 includes communications medium 12, authentication requestor 18 and adaptive authentication system 13.

Communication medium 12 provides connections between adaptive authentication system 13 and authentication requestor 18. The communications medium 12 may implement a variety of protocols such as TCP/IP, UDP, ATM, Ethernet, Fibre Channel, combinations thereof, and the like. Furthermore, the communications medium 12 may include various components (e.g., cables, switches/routers, gateways/ bridges, NAS/SAN appliances/nodes, interfaces, etc.). Moreover, the communications medium 12 is capable of having a variety of topologies (e.g., queue manager-and-spoke, ring, backbone, multi drop, point to-point, irregular, combinations thereof, and so on).

Authentication requestor 18 is constructed and arranged to receive, from a user, requests to access data and send, to adaptive authentication system 13, request 11 to authenticate the user. Authentication requestor 18 is further constructed and arranged to receive an adaptive authentication result 17 which indicates whether the user is a high risk of being a fraudulent user.

Request 11 takes the form of a message that includes various facts and their values; such messages are embedded in a payload of a data packet. Request 11 includes a username for the user and a timestamp indicating a time.

Adaptive authentication system 13 is constructed and arranged to receive authentication request 11 from authentication requestor 18. Adaptive authentication system 13 is also constructed and arranged to generate adaptive authentication result 17 based on request 11 and a baseline profile of the user, a baseline profile including a history of requests from a user over several previous time windows. Adaptive authentication system 13 is further constructed and arranged to send adaptive authentication result 17 to authentication requestor 18. Adaptive authentication system 13 includes adaptive authentication device 14 and storage device 15.

Storage device 15 is constructed and arranged to store database 16 which contains current and baseline profiles for a user. Database 16 includes a set of entries, each entry of which includes a user identifier, a time period and user data. Further detail concerning database 16 are described with regard to FIGS. 3(a), 3(b), 4(a), 4(b) and 4(c).

Adaptive authentication device 14 is constructed and arranged to perform adaptive authentication operations on request 11 according to the improved technique and takes the form of a desktop computer, laptop, server or tablet computer. Specifically, adaptive authentication device 14 receives request 11 from authentication requestor 18 and accesses the baseline profile having a user identifier matching the username of request 11. Further detail concerning adaptive authentication device 14 are described below with regard to FIG. 2.

Figure 2:
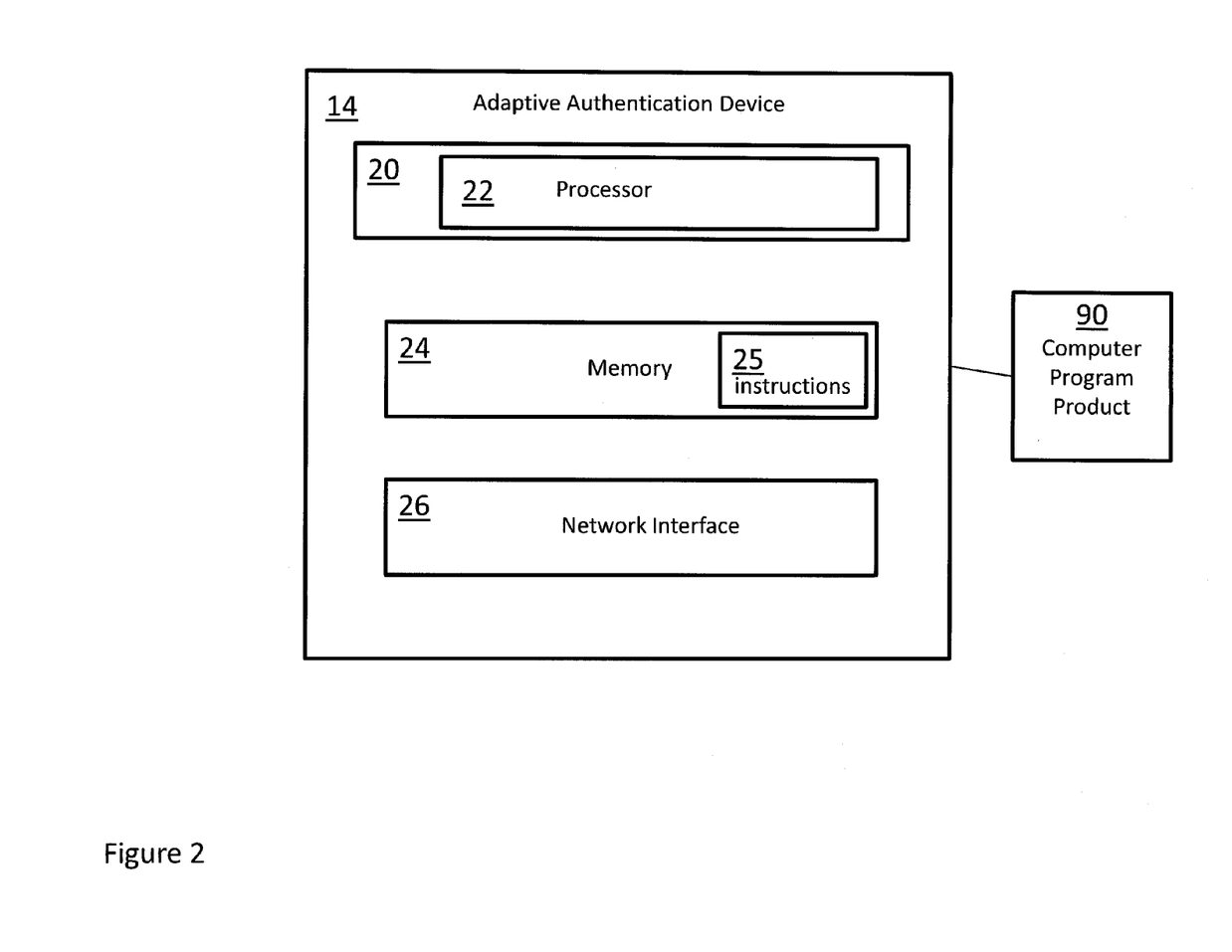
FIG. 2 is a schematic diagram illustrating an adaptive authentication device within the electronic environment shown in FIG. 1.

FIG. 2 illustrates components of adaptive authentication device 14. Adaptive authentication device 14 includes a controller 20 which in turn includes a processor 22, a memory 24 and a network interface 26.

Memory 24 is configured to store code which includes instructions 25 to process an authentication request from an authentication requestor. Memory 24 is further configured to store data from database 16 and request 11. Memory 24 generally takes the form of, e.g., random access memory, flash memory or a non-volatile memory.

Processor 22 can take the form of, but is not limited to, an Intel or AMD-based MPU, and can be a single or multi-core running single or multiple threads. Processor 22 is coupled to memory 24 and is configured to execute the instructions 25 stored in memory 24.

Network interface 26 is constructed and arranged to send and receive data over communications medium 12. Specifically, network interface 26 is configured to receive request 11 from and to send adaptive authentication result 17 to authentication requestor 18.

Returning to FIG. 1, adaptive authentication result 17 indicates a likelihood that request 11 is associated with fraudulent activity. Processor 22 generates adaptive authentication result 17 based on fact values of request 11 and user data in database

16. Further details regarding the generation of adaptive authentication result 17 are described below.

During operation, authentication requestor 18 sends request 11 to adaptive authentication device 14 via network interface 26. Processor 22 stores data such as the username, fact values and timestamp from request 11 in memory 24. Processor 22 accesses database 16 and performs a lookup operation on the username; that is, processor 22 compares the username to user identifiers in each entry of database 16 and chooses those entries having a user identifier which matches the username.

The lookup operation will result in several entries from database 16, each of whose user identifiers matches the username stored in memory 24 but has user data corresponding to a time interval. The time intervals of the entries of the database that have a user identifier that matches the username of request 11 are distinct and nonoverlapping. For example, while one entry has a time interval which ends at the current time and began at 12 AM the previous Sunday, another entry has a time interval which ends at 11:59 PM the previous Saturday and begins at 12 AM the Sunday prior, and so on.

In some arrangements, in order to limit memory consumption in storage device 15, the number of entries having user identifiers matching the username is limited those having time intervals corresponding to the current time period and the four most recent previous time periods. Thus, returning to the above example, when at 12 AM Sunday processor 22 creates a new entry in database 16 having a user identifier matching the username, processor 22 also deletes a corresponding entry having a time interval which is five weeks older than the newly created entry.

Figure 3A:
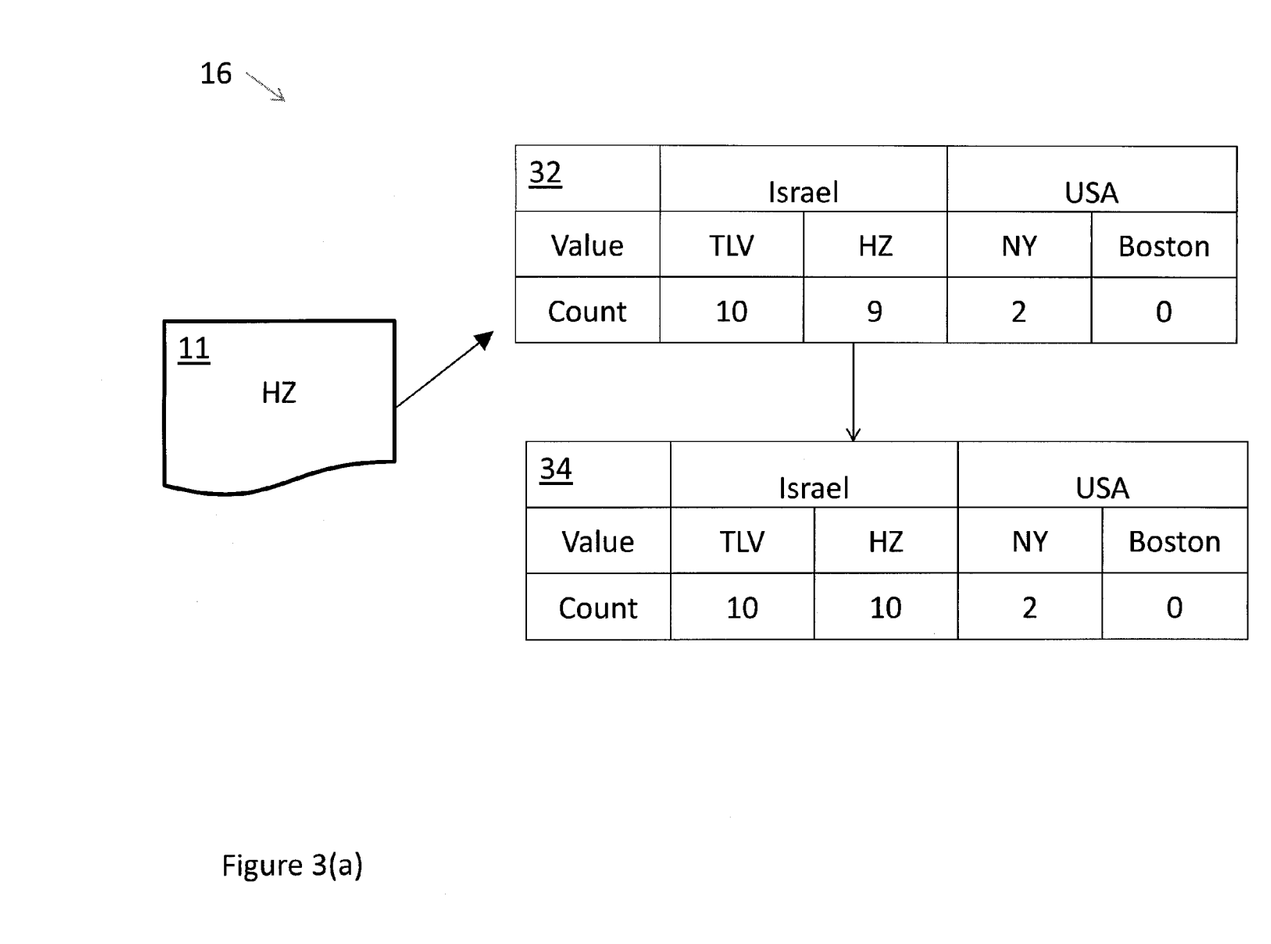
FIG. 3(a) is a schematic diagram illustrating the adaptive authentication device of FIG. 2 updating a user's statistics.
Figure 3B:
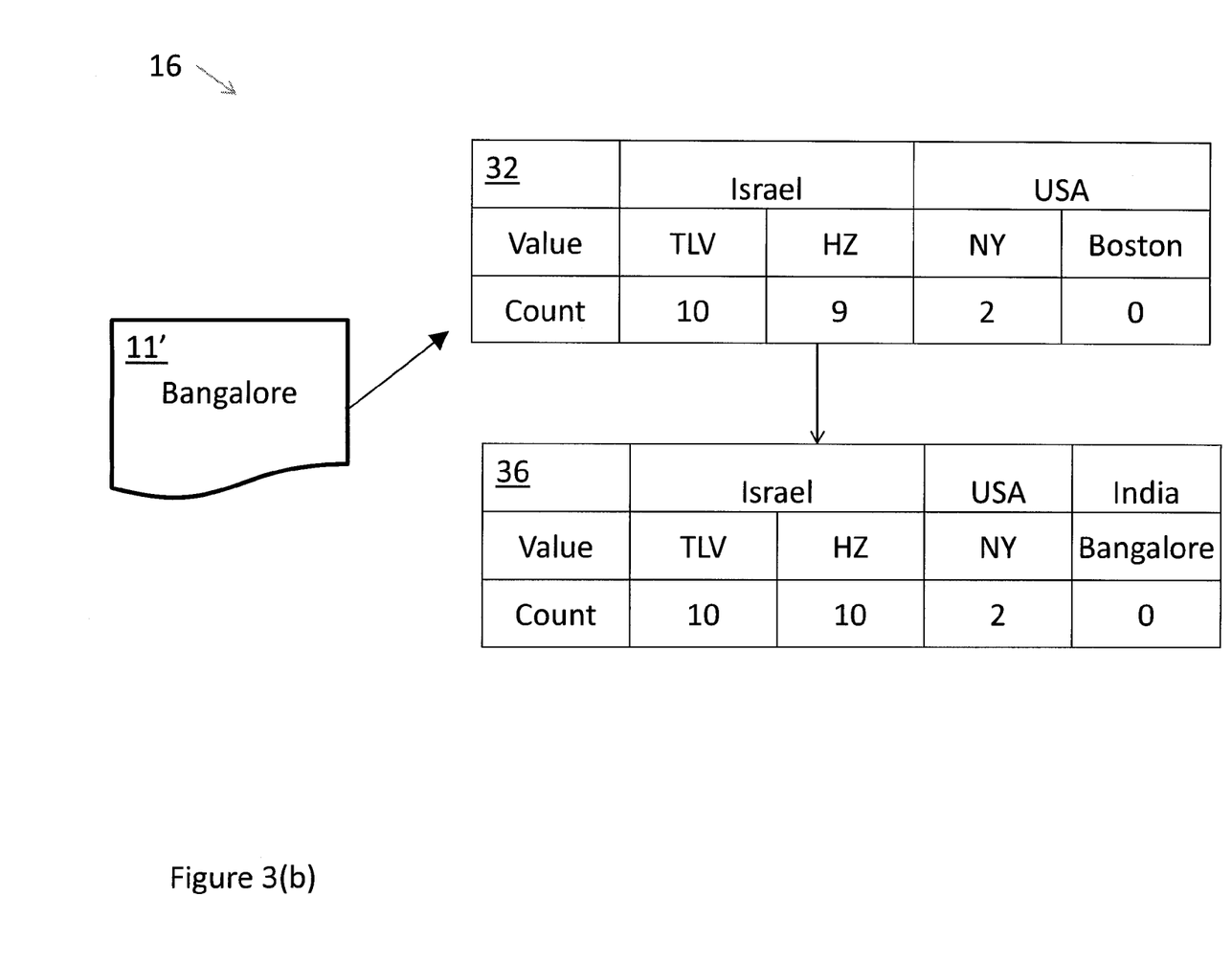
FIG. 3(b) is a schematic diagram illustrating the adaptive authentication device of FIG. 2 updating a user's statistics.

Processor 22 then combines the fact values stored in memory 24 with the fact values in the entry of database 16 that corresponds to the current time interval. Further details of how processor 22 performs this combination are described below with regard to FIGS. 3(*a*) and 3(*b*).

FIG. 3(*a*) shows schematic diagram of user data 32 stored in a particular entry of database 16. In particular, user data 32 includes fact values corresponding to locations from which the user sent a request to access data to authentication requestor 18. In the diagram shown in FIG. 3(*a*), the user data corresponds to location facts having values of cities including "TLV," "HZ," "NY" and "Boston." The user data also includes a count for each fact value, which in this case corresponds to the number of times adaptive authentication device 14 receives a request with a location fact having a value of that city. For user data 32, "TLV" has a count of 10 and "HZ" has a count of 9, while those of "NY" and "Boston" are 2 and 0, respectively.

FIG. 3(*a*) illustrates request 11 including a location fact having the value "HZ." In this case, processor 22 performs the combination by incrementing the count of "HZ" by one and not changing the counts of the other fact values. The result of this particular combination operation is the updated user data 34 that shows the count of "HZ" having the value of 10.

It should be understood that statistics associated with finely distinguished fact values such as specific cities can be less accurate because of insufficient data. In some arrangements, then, processor 16 groups finely tuned fact values into more broad categories. In FIG. 3(*b*), user data 32 and 34 each have the "TLV" and "HZ" fact values being grouped into the more broad fact value "EMEA" while the "NY" and "Boston" fact values being grouped into the more broad fact value "N America." As will be shown below, statistics based on the counts can be based on the more finely tuned fact values or the more broad fact values.

Occasionally, request 11 includes a fact value which is not included in the user data stored in the particular entry of database 16. If the amount of memory within storage device 15 were unlimited, the above combination operation would have processor 22 appending the new fact value to the user data. As that amount of memory is limited, however, processor 22 uses another procedure within the combination operation; this procedure is described below with regard to FIG. 3(*b*).

FIG. 3(*b*) illustrates another request 11' including a location fact having the value "Bangalore" on which processor 22 performs the combination operation with user data 32. In this case, however, the fact value "Bangalore" is not present in user data 32; the effect of this new fact value on user data 32 depends on the count of each fact value in user data 32. If all of the counts of the fact values are greater than zero, then the fact value having the smallest count will have its count decremented by one. In user data 32, however, the smallest count, which belongs to the fact value "Boston," is zero. In this case, the fact value "Boston" is deleted from the particular entry and replaced by the user value "Bangalore," which has a count of zero. The result of this combination operation is illustrated by user data 36. Also, the fact value "Bangalore" is grouped into the broader fact value of "S Asia."

Figure 4A:
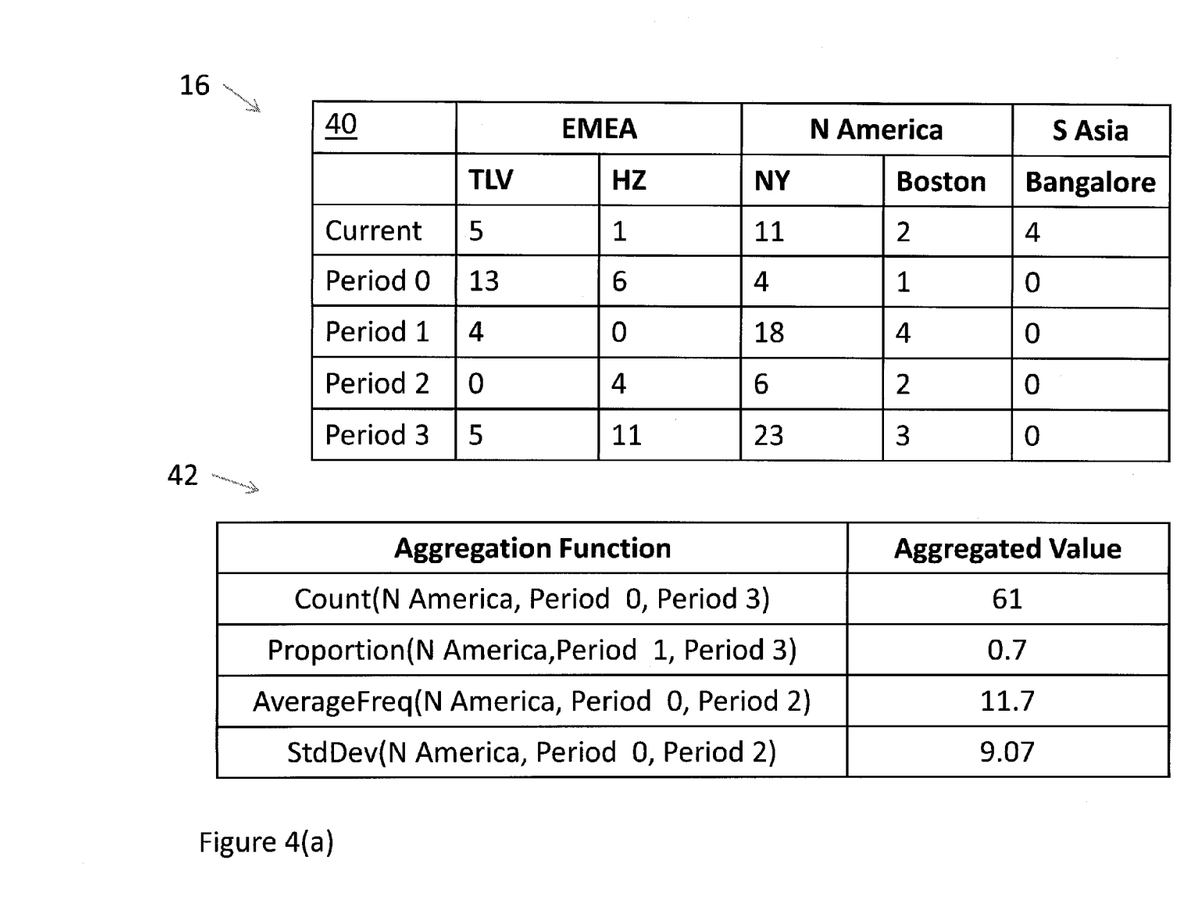
FIG. 4(a) is a schematic diagram illustrating the adaptive authentication device of FIG. 2 performing an aggregation of numerical user values.
Figure 4B:
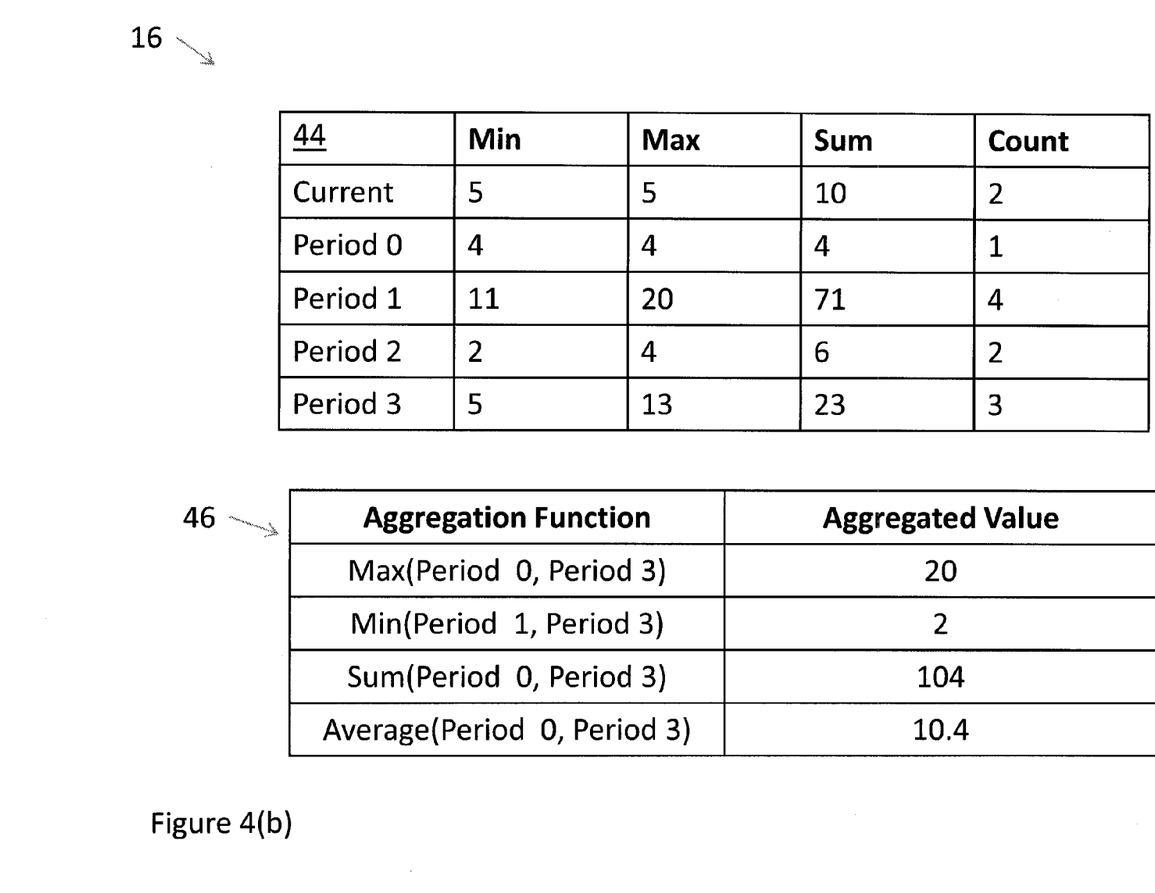
FIG. 4(b) is a schematic diagram illustrating the adaptive authentication device of FIG. 2 performing an aggregation of non-numerical user value frequencies.
Figure 4C:
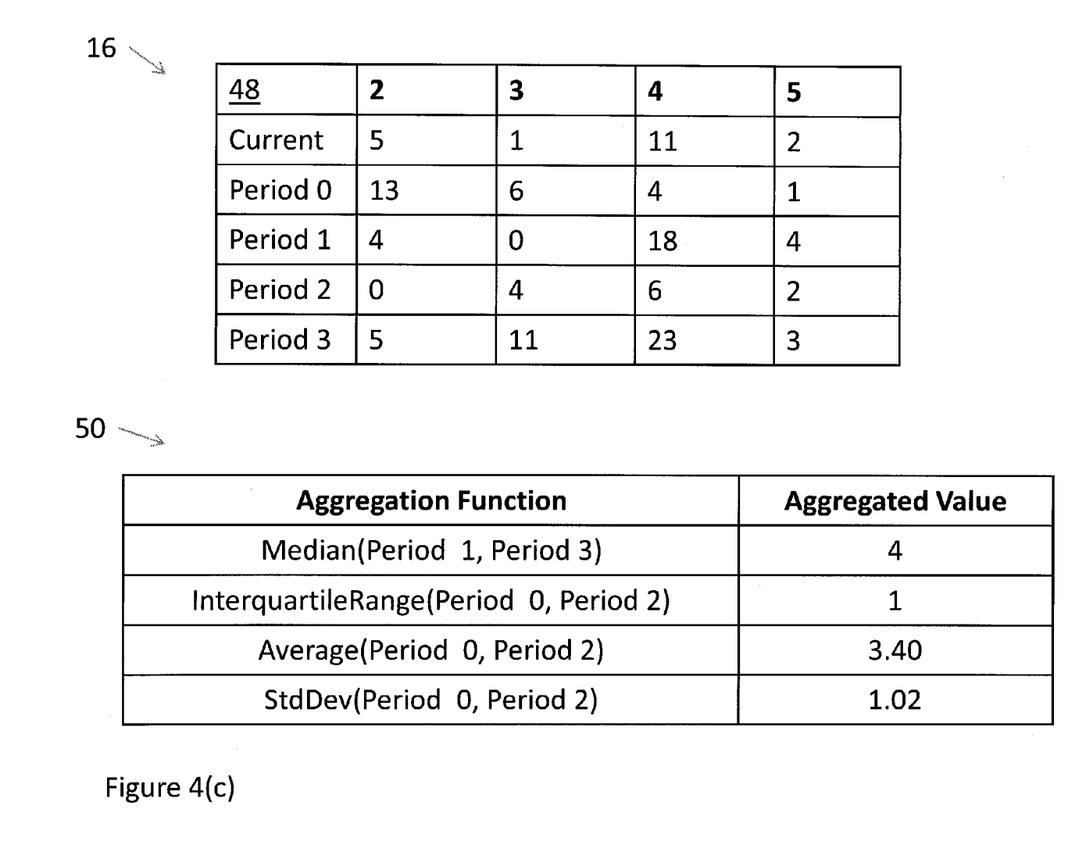
FIG. 4(c) is a schematic diagram illustrating the adaptive authentication device of FIG. 2 performing an aggregation of numerical user value frequencies.

Once processor 22 updates user data 32 according to the fact values of request 11, processor 22, as part of the adaptive authentication operation, compares the current user data (i.e., the user data of the particular entry) to previous user data, or user data of the entries having previous time periods (i.e., corresponding to previous weeks). Typically, such a comparison of current user data with previous user data involves performing an aggregation of the fact values of the previous user data which corresponds to a desired metric for risk analysis. The nature of such an aggregation depends in turn on the nature of the fact values. Further detail as to how processor 22 performs this aggregation is described below with regard to FIGS. 4(*a*), 4(*b*) and 4(*c*).

FIG. 4(*a*) shows user data 40 stored in database 16 from different time periods. In user data 40, the current data and 4 prior time periods are available for comparison. The current user data and previous user data are represented by counts corresponding to the fine user values "TLV," "HZ," "NY," "Boston" and "Bangalore," as well as the broad user values "EMEA," "N America" and "India." The current user data, in the row of user data labeled "Current," is a continuation of user data 32 in FIGS. 3(*a*) and 3(*b*) with the fact value "Bangalore" having been included in four additional requests.

When the fact values are ordinal, processor 22 performs aggregation operations on the counts of the fact values. Such aggregation operations are illustrated in table 42. For a Count operation on a fact value, processor 22 adds the number of counts for that fact value over the input time periods; in the example shown, there number of requests having fact value "N America" is 61 between the past four time periods. For a Proportion operation on a fact value, processor 22 computes the ratio of the number of requests having the fact value over the specified time periods to the total number of requests from the fact values present in user data 40. (That is, the requests corresponding to deleted fact values are not counted.) For an AverageFreq operation on a fact value, processor 22 performs a Count operation and divides the result by the number of input time periods. For a StdDev operation on a fact value, processor 22 computes a standard deviation of the counts of the fact value over the input time periods.

Once processor 22 performs the aggregation operation on the previous user data, processor 22 completes the comparison operation by considering the current user data in the light of the results of the aggregation operation. For example, the mean number of counts of fact value "N America" from the previous 3 time periods is 11.7 with a standard deviation of 9.07; a comparison operation involves processor 22 computing the ratio of a deviation of the count of current fact value "N America" from the mean, and the standard deviation.

Other fact types beside those shown in user data may have other types of operations performed on them. Such fact types and corresponding operations are described in detail with regard to FIGS. 4(*b*) and 4(*c*).

FIG. 4(*b*) shows user data 44 from current and previous time periods. User data 44 corresponds to a numerical fact type such as a transaction amount in dollars. User data 44 shows, for each time period, a minimum value ("Min"), a maximum value ("Max"), a sum of the values ("Sum") and the number of requests received ("Count"). Aggregation operations on such user data is summarized in table 46. A Max operation involves processor 22 selecting the maximum value from the "Max" column over the input time periods. The Min operation involves processor 22 selecting the minimum value from the "Min" column over the input time periods. The Sum operation involves processor 22 adding the values from the "Sum" column over the input time periods. The Average operation involves processor 22 dividing the result of the Sum operation by the total of the values of the "Count" column over the input time periods.

FIG. 4(*c*) shows user data 48 from current and previous time periods. User data 48 corresponds to a numerical fact type that takes on a finite range of values. In this case, each numerical value has a corresponding count. In user data 48, the fact values are 2, 3, 4 and 5; the entries of the rows corresponding to the current and previous time periods represent the corresponding counts. In this case, processor 22 performs additional aggregation operations in addition to those illustrated in tables 42 (FIGS. 4(*a*)) and 46 (FIG. 4(*b*)), shown in table 50. For example, a Median operation involves processor 22 computing a median of the fact values weighted by their respective counts over the input time periods. Specifically, processor 22 would compute the median value between Period 1 and Period 3 by considering 2, 9 times, 3, 15 times, 4, 47 times and 5, 9 times. An InterquartileRange operation involves processor 22 computing an interquartile range on the fact values weighted by their respective counts over the input time periods. An average operation involves processor 22 computing an arithmetic mean of the fact values weighted by their respective counts over the input time periods. A StdDev operation involves processor 22 computing a standard deviation on the fact values weighted by their respective counts over the input time periods.

Once processor 22 completes the comparison operation on the current and previous user data, processor 22 generates adaptive authentication result 17 which is indicative of a risk of request 11 being associated with fraudulent activity. In some arrangements, processor 22 sends the results of the comparison operation to a risk engine that performs further analysis, for example, Bayesian analysis. Processor 22 results of such further analysis and generates adaptive authentication result 17 based on those results.

Advantageously, adaptive authentication result 17 is based on a comparison operation between current user data and previous user data from the same user. That is, outliers in the current data are detected based on an individual's baseline profile and not someone else's profile. In this way, adaptive authentication result 17 represents a more robust result when the user's behavior is atypical but consistent. Further, the adaptive authentication operation described above dynamically assigns memory based on the most relevant fact values; in this way, memory usage is reduced to a sustainable level.

Figure 5:
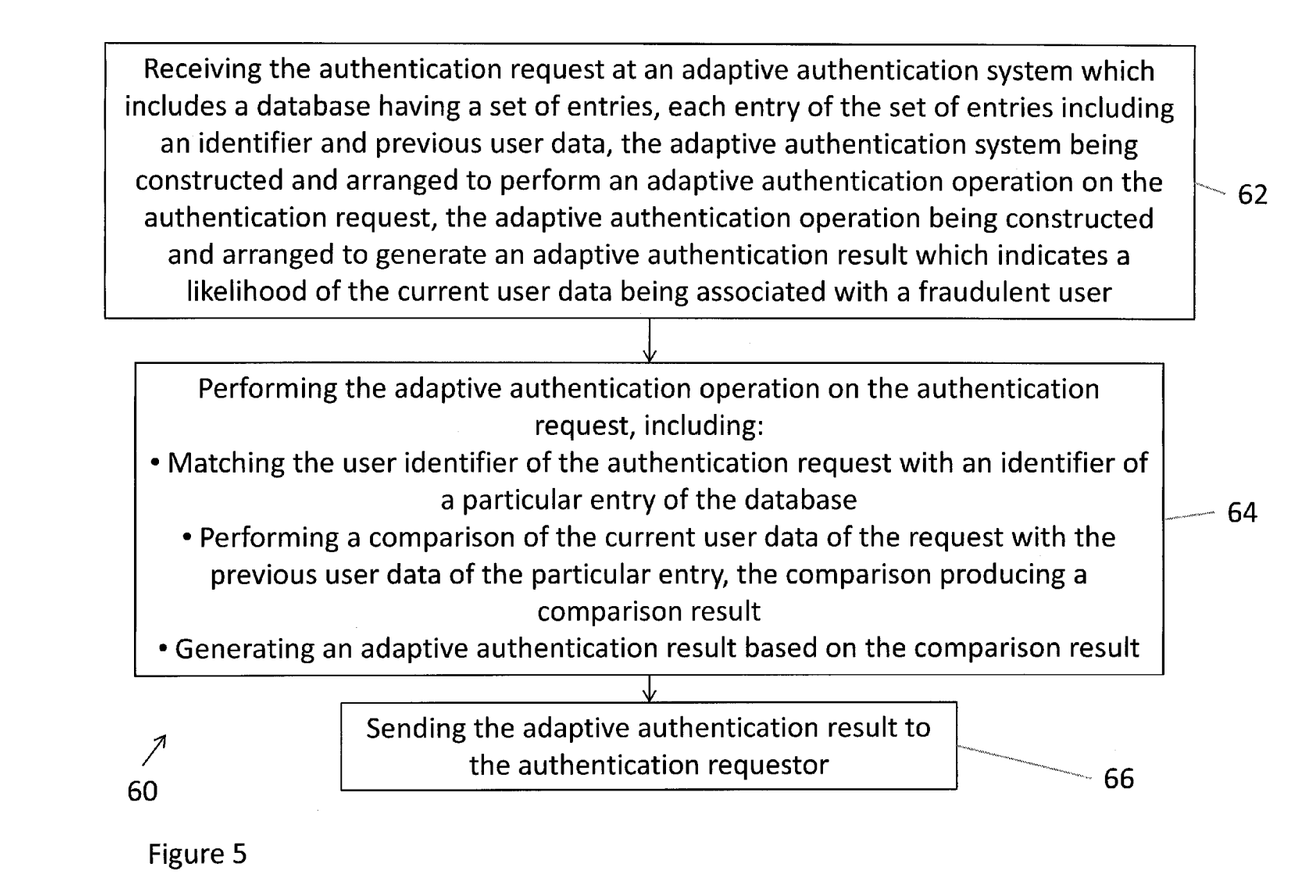
FIG. 5 is a flow chart illustrating a method of carrying out the improved technique within the electronic environment shown in FIG. 1.

FIG. 5 shows a flow chart which illustrates a method 60, carried out by processor 22, of processing an authentication request from an authentication requestor. In step 62, the authentication request is received at an adaptive authentication system which includes a database having a set of entries, each entry of the set of entries including an identifier and previous user data, the adaptive authentication system being constructed and arranged to perform an adaptive authentication operation on the authentication request, the adaptive authentication operation being constructed and arranged to generate an adaptive authentication result which indicates a likelihood of the current user data being associated with a fraudulent user. In step 64, the adaptive authentication operation is performed on the authentication request. In step 66, the adaptive authentication result is sent to the authentication requestor.

The adaptive authentication operation in step 64 includes matching the user identifier of the authentication request with an identifier of a particular entry of the database. The adaptive authentication operation also includes performing a comparison of the current user data of the request with the previous user data of the particular entry, the comparison producing a comparison result. The adaptive authentication operation further includes generating an adaptive authentication result based on the comparison result.

While various embodiments of the invention have been particularly shown and described, it will be understood by those skilled in the art that various changes in form and details may be made therein without departing from the spirit and scope of the invention as defined by the appended claims.

Furthermore, it should be understood that some embodiments are directed to adaptive authentication device 14 which identifies particular events for alerting within event notification management system. Some embodiments are directed to adaptive authentication device 14. Some embodiments are directed to a system which processes an authentication request from an authentication requestor. Some embodiments are directed to a method of processing an authentication request from an authentication requestor. Also, some embodiments are directed to a computer program product which enables computer logic to process an authentication request from an authentication requestor.

In some arrangements, adaptive authentication device 14 is implemented by a set of processors or other types of control/processing circuitry running software. In such arrangements, the software instructions can be delivered to adaptive authentication device 14 in the form of a computer program product (illustrated generally by code for computer program 90 stored within memory 24 in FIG. 2) having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of processing an authentication request from an authentication requestor, the authentication request including a user identifier and current user data, the method comprising:

receiving the authentication request at an adaptive authentication system which includes a database having a set of entries, each entry of the set of entries including an identifier and previous user data, the adaptive authentication system being constructed and arranged to perform an adaptive authentication operation on the authentication request, the adaptive authentication operation being constructed and arranged to generate an adaptive authentication result which indicates a likelihood of the authentication request being associated with fraudulent activity;

performing the adaptive authentication operation on the authentication request, including:
matching the user identifier of the authentication request with an identifier of a particular entry of the database;
performing a comparison of the current user data of the authentication request with the previous user data of the particular entry, the comparison producing a comparison result; and
generating an adaptive authentication result based on the comparison result; and sending the adaptive authentication result to the authentication requestor;
wherein the current user data includes a fact identifier and a current fact value which is associated with the fact identifier;
wherein the previous data of the particular entry includes a set of previous fact values, each previous fact value being associated with the fact identifier and including a fact value count; and
wherein performing the adaptive authentication operation on the authentication request further includes:
if the current fact value is equal to a previous fact value of the set of previous fact values:
incrementing the fact value count of the previous fact value to which the current fact value is equal; and
if the current fact value is not equal to a previous fact value of the set of previous fact values:
locating a minimal previous fact value of the set of previous fact values, the minimal previous fact value having the smallest fact value count of the fact value counts of the previous fact values of the set of previous fact values;
decrementing the fact value count of the minimal previous fact value;
if the fact value count of the minimal previous fact value is less than or equal to zero:
removing the minimal previous fact value from the set of previous fact values; and
adding the current fact value to the set of previous fact values; and
if the fact value count of the minimal previous fact value is greater than zero:
retaining the minimal previous fact value in the set of previous fact values.

2. A method as in claim 1, further comprising:
receiving, at the adaptive authentication system and from another authentication requestor, another authentication request having a user identifier which is distinct from the user identifier of the authentication request; and
performing the adaptive authentication operation on the another authentication request;
wherein an entry having an identifier which matches the user identifier of the another authentication request is distinct from the particular entry.

3. A method as in claim 1, wherein fact values which are associated with the fact identifier are selected from a continuous range of possible fact values;
wherein performing the adaptive authentication operation on the authentication request further includes:
setting the current fact value associated with the fact identifier equal to the nearest integral value to the natural logarithm of a possible fact value within the continuous range of possible fact values.

4. A method as in claim 1, wherein the previous user data further includes a time interval;
wherein each identifier of an entry of the set of entries of the database is included in a subset of entries of the set of entries, each entry of the subset of entries including previous user data which includes a time interval having a start time and an end time, the previous user data of a first entry of the subset of entries having a time interval which is distinct from and nonoverlapping with respect to the time interval of the previous user data of a second entry of the subset of entries;
wherein the current user data includes a timestamp which indicates a current time;
wherein matching the user identifier of the authentication request with an identifier of a particular entry of the database includes:
finding the entry of the subset of entries having previous data which includes a time interval which has a start time earlier than the current time and an end time at the same time as or later than the current time.

5. A method as in claim 4, wherein the length of the time interval of the previous user data of each entry of the database is set to be less than or equal to a predetermined time period;
wherein the number of entries in the subset of entries which includes an identifier is less than a predetermined number;
wherein the subset of entries has an earliest entry, the earliest entry including previous data having a time interval which has a start time which is earlier than other start times of time intervals of previous data of the other entries of the subset of entries;
wherein finding the entry of the subset of entries having previous data which includes a time interval which has a start time earlier than the current time and an end time at the same time as or later than the current time includes:
deleting the authentication request when the current time indicated by the timestamp of the current user data is earlier than the start time of the time interval of the previous user data of the earliest entry of the subset of entries which have an identifier matching the user identifier of the request; and
maintaining the request when the current time indicated by the timestamp of the current user data is later than the start time of the time interval of the previous user data of the latest entry of the subset of entries which have an identifier matching the user identifier of the request.

6. A method as in claim 5, wherein the subset of entries includes a latest entry which includes previous data having a time interval which has an end time which is later than other end times of time intervals of previous data of the other entries of the subset of entries;
wherein the entries of the subset of entries other than the earliest entry form a set of prior entries;
wherein the particular entry is the latest entry;
wherein performing the comparison of the current user data of the request with the previous user data of the particular entry further includes:
performing an aggregation operation on a specific previous fact value of each of the entries of the prior set of entries, the aggregation operation producing an aggregate specific previous fact value of the prior set of entries; and for the specific previous fact value, comparing the aggregate specific previous fact value of the prior set of entries with the specific previous fact value of the particular entry.

7. A method as in claim 6, wherein performing the aggregation operation on the specific previous fact value of each of the entries of the prior set of entries includes:
generating an average specific previous fact value which is an arithmetic mean of the specific previous fact value of each of the entries of the prior set of entries;
wherein comparing the aggregate specific previous fact value of the prior set of entries to the specific previous fact value of the particular entry includes:
comparing the average specific previous fact value with the specific previous fact value of the particular entry.

8. A method as in claim 6, wherein performing the comparison of the current user data of the request with the previous user data of the particular entry further includes:
performing another aggregation operation on the fact value count of the specific previous fact value of each of the entries of the prior set of entries, the another aggregation operation producing an aggregate fact value count of the specific previous fact value of the prior set of entries; and
for the specific previous fact value, comparing the aggregate fact value count of the specific previous fact value of the prior set of entries with the fact value count of the specific previous fact value of the particular entry.

9. A method as in claim 8, wherein performing the another aggregation operation on the fact value count of the specific previous fact value of each of the entries of the prior set of entries includes:
generating an average specific previous fact value count which is an arithmetic mean of the fact value count of the specific previous fact value of each of the entries of the prior set of entries;
generating a specific previous fact value count standard deviation which is a standard deviation of the fact value count of the specific previous fact value of each of the entries of the prior set of entries;
wherein comparing the aggregate fact value count of the specific previous fact value of the prior set of entries with the fact value count of the specific previous fact value of the particular entry includes:
generating a fact value count deviation which is equal to a deviation of the fact value count of the specific previous fact value of the particular entry from the average specific previous fact value count; and
generating an outlier measure which is equal to a ratio of the fact value count deviation to the specific previous fact value count standard deviation.

10. A system constructed and arranged to process an authentication request from an authentication requestor, the authentication request including a user identifier and current user data, the system comprising:
a storage system which includes a database having a set of entries, each entry of the set of entries including an identifier and previous user data, and
an adaptive authentication device which is constructed and arranged to perform an adaptive authentication operation on the authentication request, the adaptive authentication operation being constructed and arranged to generate an adaptive authentication result which indicates a likelihood of the authentication request being associated with fraudulent activity, the adaptive authentication device including a network interface, a memory and a controller which includes controlling circuitry coupled to the memory, the controlling circuitry being constructed and arranged to:
receive the authentication request;
perform the adaptive authentication operation on the authentication request, including:
matching the user identifier of the authentication request with an identifier of a particular entry of the database;
performing a comparison of the current user data of the authentication request with the previous user data of the particular entry, the comparison producing a comparison result; and
generating an adaptive authentication result based on the comparison result; and
send the adaptive authentication result to the authentication requestor;
wherein the current user data includes a fact identifier and a current fact value which is associated with the fact identifier;
wherein the previous data of the particular entry includes a set of previous fact values, each previous fact value being associated with the fact identifier and including a fact value count; and
wherein performing the adaptive authentication operation on the authentication request further includes:
if the current fact value is equal to a previous fact value of the set of previous fact values:
incrementing the fact value count of the previous fact value to which the current fact value is equal; and
if the current fact value is not equal to a previous fact value of the set of previous fact values:
locating a minimal previous fact value of the set of previous fact values, the minimal previous fact value having the smallest fact value count of the fact value counts of the previous fact values of the set of previous fact values;
decrementing the fact value count of the minimal previous fact value;
if the fact value count of the minimal previous fact value is less than or equal to zero:
removing the minimal previous fact value from the set of previous fact values; and
adding the current fact value to the set of previous fact values; and
if the fact value count of the minimal previous fact value is greater than zero:
retaining the minimal previous fact value in the set of previous fact values.

11. A system as in claim 10, wherein the controlling circuitry is further constructed and arranged to:
receive, from another authentication requestor, another authentication request having a user identifier which is distinct from the user identifier of the authentication request; and
perform the adaptive authentication operation on the another authentication request;
wherein an entry having an identifier which matches the user identifier of the another authentication request is distinct from the particular entry.

12. A system as in claim 10, wherein fact values which are associated with the fact identifier are selected from a continuous range of possible fact values;
wherein performing the adaptive authentication operation on the authentication request further includes:
setting the current fact value associated with the fact identifier equal to the nearest integral value to the natural logarithm of a possible fact value within the continuous range of possible fact values.

13. A system as in claim 10, wherein the previous user data further includes a time interval;
  wherein each identifier of an entry of the set of entries of the database is included in a subset of entries of the set of entries, each entry of the subset of entries including previous user data which includes a time interval having a start time and an end time, the previous user data of a first entry of the subset of entries having a time interval which is distinct from and nonoverlapping with respect to the time interval of the previous user data of a second entry of the subset of entries;
  wherein the current user data includes a timestamp which indicates a current time;
  wherein matching the user identifier of the authentication request with an identifier of a particular entry of the database includes:
    finding the entry of the subset of entries having previous data which includes a time interval which has a start time earlier than the current time and an end time at the same time as or later than the current time.

14. A system as in claim 13, wherein the length of the time interval of the previous user data of each entry of the database is set to be less than or equal to a predetermined time period;
  wherein the number of entries in the subset of entries which includes an identifier is less than a predetermined number;
  wherein the subset of entries has an earliest entry, the earliest entry including previous data having a time interval which has a start time which is earlier than other start times of time intervals of previous data of the other entries of the subset of entries;
  wherein finding the entry of the subset of entries having previous data which includes a time interval which has a start time earlier than the current time and an end time at the same time as or later than the current time includes:
    deleting the authentication request when the current time indicated by the timestamp of the current user data is earlier than the start time of the time interval of the previous user data of the earliest entry of the subset of entries which have an identifier matching the user identifier of the request; and
    maintaining the request when the current time indicated by the timestamp of the current user data is later than the start time of the time interval of the previous user data of the latest entry of the subset of entries which have an identifier matching the user identifier of the request.

15. A system as in claim 14, wherein the subset of entries includes a latest entry which includes previous data having a time interval which has an end time which is later than other end times of time intervals of previous data of the other entries of the subset of entries;
  wherein the entries of the subset of entries other than the earliest entry form a set of prior entries;
  wherein the particular entry is the latest entry;
  wherein performing the comparison of the current user data of the request with the previous user data of the particular entry further includes:
    performing an aggregation operation on a specific previous fact value of each of the entries of the prior set of entries, the aggregation operation producing an aggregate specific previous fact value of the prior set of entries; and
    for the specific previous fact value, comparing the aggregate specific previous fact value of the prior set of entries with the specific previous fact value of the particular entry.

16. A system as in claim 15, wherein performing the comparison of the current user data of the request with the previous user data of the particular entry further includes:
  performing another aggregation operation on the fact value count of the specific previous fact value of each of the entries of the prior set of entries, the another aggregation operation producing an aggregate fact value count of the specific previous fact value of the prior set of entries; and
  for the specific previous fact value, comparing the aggregate fact value count of the specific previous fact value of the prior set of entries with the fact value count of the specific previous fact value of the particular entry.

17. A computer program product having a non-transitory computer readable storage medium which stores code to process an authentication request from an authentication requestor, the computer-readable storage medium being included in an adaptive authentication system which is constructed and arranged to perform an adaptive authentication operation on the authentication request, the adaptive authentication operation being constructed and arranged to generate an adaptive authentication result which indicates a likelihood of the authentication request being associated with fraudulent activity, the adaptive authentication system including a database having a set of entries, each entry of the set of entries including an identifier and previous user data, the code including instructions to:
  receive the authentication request;
  perform the adaptive authentication operation on the authentication request, including:
    matching the user identifier of the authentication request with an identifier of a particular entry of the database;
    performing a comparison of the current user data of the authentication request with the previous user data of the particular entry, the comparison producing a comparison result; and
    generating an adaptive authentication result based on the comparison result; and
  send the adaptive authentication result to the authentication requestor;
  wherein the code further includes instructions to:
    receive, from another authentication requestor, another authentication request having a user identifier which is distinct from the user identifier of the authentication request; and
    perform the adaptive authentication operation on the another authentication request;
    wherein an entry having an identifier which matches the user identifier of the another authentication request is distinct from the particular entry;
  wherein the current user data includes a fact identifier and a current fact value which is associated with the fact identifier;
  wherein the previous data of the particular entry includes a set of previous fact values, each previous fact value being associated with the fact identifier and including a fact value count; and
  wherein performing the adaptive authentication operation on the authentication request further includes:
    if the current fact value is equal to a previous fact value of the set of previous fact values:
      incrementing the fact value count of the previous fact value to which the current fact value is equal; and if the current fact value is not equal to a previous fact value of the set of previous fact values:
  locating a minimal previous fact value of the set of previous fact values, the minimal previous fact value having the smallest fact value count of the fact value counts of the previous fact values of the set of previous fact values;
  decrementing the fact value count of the minimal previous fact value;
  if the fact value count of the minimal previous fact value is less than or equal to zero:
    removing the minimal previous fact value from the set of previous fact values; and
    adding the current fact value to the set of previous fact values; and
  if the fact value count of the minimal previous fact value is greater than zero:
    retaining the minimal previous fact value in the set of previous fact values.

\* \* \* \* \*